US006673144B2

(12) United States Patent
Immordino, Jr. et al.

(10) Patent No.: US 6,673,144 B2
(45) Date of Patent: Jan. 6, 2004

(54) JOINT COMPOUND PROVIDING LOW DUSTING AND GOOD GLOSS RETENTION

(75) Inventors: Salvatore C. Immordino, Jr., Trevor, WI (US); Richard B. Stevens, Crystal Lake, IL (US)

(73) Assignee: United States Gypsum Company, Chicago, IL (US)

( * ) Notice: Subject to any disclaimer, the term of this patent is extended or adjusted under 35 U.S.C. 154(b) by 0 days.

(21) Appl. No.: 10/093,771

(22) Filed: Mar. 8, 2002

(65) Prior Publication Data

US 2002/0129744 A1 Sep. 19, 2002

Related U.S. Application Data

(63) Continuation-in-part of application No. 09/502,740, filed on Feb. 11, 2000, now Pat. No. 6,355,099.
(60) Provisional application No. 60/284,986, filed on Apr. 19, 2001.

(51) Int. Cl.[7] ........................... C04B 11/00; C04B 24/00
(52) U.S. Cl. ...................... 106/778; 106/270; 106/271; 106/272; 106/802; 106/817; 106/822; 524/4; 524/423; 524/425
(58) Field of Search ................................. 106/778, 802, 106/817, 822, 270, 271, 272; 524/4, 423, 425

(56) References Cited

U.S. PATENT DOCUMENTS

| 2,623,830 A | * | 12/1952 | Aronberg | 106/245 |
|---|---|---|---|---|
| 3,414,462 A | | 12/1968 | Cafferata | 161/166 |
| 3,445,323 A | | 5/1969 | Schnabel | 161/162 |
| 3,622,361 A | | 11/1971 | Bolton et al. | 106/93 |
| 3,719,513 A | | 3/1973 | Bragg et al. | 106/114 |
| 4,061,614 A | | 12/1977 | Self | 260/40 |
| 4,454,267 A | | 6/1984 | Williams | 524/43 |
| 4,525,388 A | | 6/1985 | Rehder et al. | 427/221 |
| 4,587,279 A | | 5/1986 | Salyer et al. | 523/206 |
| 4,804,688 A | | 2/1989 | Vassileff | 521/64 |
| 4,876,142 A | | 10/1989 | Piccirillo | 428/224 |
| 5,482,551 A | | 1/1996 | Morris et al. | 106/772 |
| 5,534,059 A | | 7/1996 | Immordino, Jr. | 106/778 |
| 5,741,844 A | | 4/1998 | Nass et al. | 524/523 |
| 5,746,822 A | | 5/1998 | Espinoza et al. | 106/785 |
| 6,355,099 B1 | * | 3/2002 | Immordino et al. | 106/778 |
| 6,358,309 B1 | * | 3/2002 | Langford | 106/661 |
| 6,379,458 B1 | * | 4/2002 | Immordino et al. | 106/772 |
| 6,406,537 B1 | * | 6/2002 | Immordino | 106/778 |
| 6,545,066 B1 | * | 4/2003 | Immordino et al. | 523/218 |

FOREIGN PATENT DOCUMENTS

WO  WO/00/34200  6/2000

OTHER PUBLICATIONS

Chemical Abstract No. 105:28885, abstract of Hungarian; Patent Specification No. 34528 (Mar. 1985).

* cited by examiner

*Primary Examiner*—Anthony J. Green
(74) *Attorney, Agent, or Firm*—Greer, Burns & Crain, Ltd.; John M Lorenzen, Esq.; David F. Janci, Esq.

(57) ABSTRACT

The present invention provides a low dusting joint compound comprising a filler, a binder, a thickener and one or more synthetic polymeric waxes that are at least slightly soluble in water and are solid at room temperature. Preferably the wax includes a high molecular weight polyethylene glycol or methoxy polyethylene glycol having an average melting point of from about 80° F. (27° F.) to about 150° F. (80° C.). These additives impart low dusting properties without a sticky or oily feel. High molecular weight synthetic waxes also act as an internal binder to hold the joint compound together and improves paint gloss retention. The invention results in a joint compound with improved properties for drywall finishing.

22 Claims, 5 Drawing Sheets

Improved Gloss Retention of Plus 3 using PEG Additive

PERCENT AIRBORNE DUST FALLOUT DISTANCE

FIG. 5

JOINT COMPOUND PROVIDING LOW DUSTING AND GOOD GLOSS RETENTION

CROSS REFERENCE TO RELATED APPLICATIONS

This application is a continuation-in-part of U.S. Ser. No. 09/502,740, entitled "A Plaster Mixture for Forming a Machinable Composition," filed Feb. 11, 2000, U.S. Pat. No. 6,355,099, which is hereby incorporated by reference, and claims the benefit of U.S. Provisional Application No. 60/284,986, filed Apr. 19, 2001, herein incorporated by reference.

BACKGROUND OF THE INVENTION

This invention relates to a composition for a joint compound for use in filling and coating the joints between adjacent panels of gypsum wallboard. More specifically, it relates to a composition for a lightweight joint compound of the setting or drying type that generates less airborne dust when the set or dried joint compound is sanded, and additionally provides for more uniform gloss retention upon painting.

In the construction of buildings, one of the most common elements is gypsum wallboard, often known as drywall, used in the construction of walls and/or ceilings. Walls made from gypsum wallboard are traditionally constructed by affixing the panels to wood studs or metal framing, and treating the joints between adjoining panels with a specially prepared adhesive called a joint compound. The seams between adjoining panels are coated with joint compound in such a way that a monolithic surface is created when finished. This process generally proceeds by placing a taping joint compound over the joint formed by the abutted edges of the wallboards, and embedding a liquid-permeable paper or fiberglass reinforcing tape within that compound. When dry (or set), a second coating referred to as a topping joint compound is applied over the joint, which may be subsequently lightly sanded upon drying. A third or finish coat is applied, allowed to dry, and lightly sanded to create the smooth monolithic surface that conceals any indication of where the drywall seams were. Another type of joint compound is an all-purpose grade that may be used for both embedding the joint tape and for applying the finish coats. A patterned or textured effect may be given to the finished wall and joint through the use of special application tools.

There are several categories of joint compounds. Drying type compounds cure through the evaporation of water, whereas setting type joint compounds chemically react with water during the curing process. Setting type joint compounds typically use calcium sulfate hemihydrate, also known as stucco or Plaster of Paris, as a base. When water is added to the setting type powder, it reacts with the calcium sulfate hemihydrate via a hydration reaction to form an interlocking matrix of calcium sulfate dihydrate crystals. The interlocking crystal matrix gives the compound increased strength. The benefit of a setting type joint compound over a drying type is an independence from having to wait for the joint compound to be completely dry prior to further finishing, as well as less shrinkage and cracking, and a higher overall strength of the finished joint. Drying type joint compounds have the advantage of ease of use, as they typically come in a ready mixed form, with water being added and mixed by the manufacturer. A third type of joint compound combines the setting action of a calcium sulfate hemihydrate based compound with the ease of use of a ready mixed compound. The properties of a ready mixed setting type joint compound are taught in U.S. Pat. No. 5,746,822, incorporated herein by reference.

Between coats of joint compound, and before the wall is finished, it is necessary to sand the joint compound to even the surface. While doing so, the dust generated is generally very fine and much of it tends to remain airborne, settling out only after long periods of time. This long residence time in the air allows it to travel long distances from the site of the sanding. During sanding of a home repair, for example, this fine dust is not confined to the area immediately adjacent to where the joint compound is being used, but is often found throughout the house, resulting in fine dust settling everywhere.

Liquid paraffin and oils are known to reduce dust in plaster-based compositions, such as those disclosed in PCT Publication WO/00/34200. However, these additives have a number of drawbacks. When such liquids are included in the applied composition, they tend to migrate toward the surface of the workpiece, giving an uneven distribution of dust reducing properties within the applied composition. The migration may cause the plaster to dry unevenly as well. Oil and liquid waxes also can cause loss of adhesion to the substrate at higher concentrations.

Additionally, it is preferable that the dried joint compound provides a similar surface porosity to the face paper of gypsum drywall in order to generate an even gloss or sheen across a finished wall after painting. If the joint compound is more porous than the face paper of the drywall, the finish coat of paint will be visibly different over the areas of the wall that have been treated with joint compound. Application of primers, drywall surfacers, or even skim coating the entire wall with a thin layer of joint compound are examples of methods that have been used to minimize the porosity differences sometimes encountered in drywall finishing. Differences in porosity and texture and their effect on paint finishes are most obvious when the wall assembly is finished by painting with a gloss or a semi-gloss paint. In order to produce a painted surface that looks uniform from various viewing angles, it is desirable to more closely match both the porosity and the texture of the joint compound with those properties at the paper surface of the gypsum drywall panel.

Joint compounds are also easier with which to work if certain properties are satisfied. Workability and slip of joint compounds make them easier to apply to the wall, easier to trowel to a smooth finish, and they dry less quickly, giving the novice applicator more time with which to work with the joint compound.

There is, therefore, a need in the art for an improved joint compound that has improved application properties and shows higher levels of gloss retention under a variety of lighting. There is also a need for a joint compound that minimizes or localizes generation of airborne dust.

SUMMARY OF THE INVENTION

These and other needs are met or exceeded by the present invention that features a joint compound that minimizes or localizes dust when the dried or set joint is sanded.

More specifically, the present invention provides a low dusting joint compound comprising a filler, a binder, a thickener and one or more synthetic polymeric waxes that are at least slightly soluble in water and are solid at room temperature. Preferably the wax is a high molecular weight polyethylene glycol or methoxy polyethylene glycol having an average melting point of from about 80° F. (27° F.) to about 150° F. (80° C.). This additive imparts low dusting properties without a sticky or oily feel. High molecular weight synthetic waxes also act as an internal binder to hold the joint compound together and improve the gloss retention of the joint compound.

Petroleum oils, residues and paraffins are known to reduce dusting in plasters or joint compounds however, they are all liquids by nature. Unexpectedly, the present inventors have found that high molecular weight synthetic waxes, in the form of solids, also have the ability to agglomerate particle fines during the cutting, abrading or sanding of joint compounds. The joint compound of this invention does not necessarily produce less dust or fines, but the fine particles of joint compound that are created during sanding are agglomerated into larger particles that are less likely to remain airborne. As used in this application, the concept of reducing dust refers to reducing of airborne dust or fines.

While not wishing to be bound by theory, it is believed that the hard waxes soften under the friction of abrasion, agglomerate the fine particles in the vicinity of the softened wax, and then harden again very quickly. Compared to liquid oils and waxes, the solid wax of this invention does not tend to migrate toward the surface of the workpiece resulting in an uneven distribution of the low dusting additive, and functions well as an internal binder, holding the joint compound together. The higher molecular weight particles also agglomerate the dust fines without any stickiness or oiliness. The agglomerated particles often fall cleanly away from the work surface, rather than sticking to the surface of the wall or tools, or becoming airborne for longer time periods and settling a farther distance away from the sanding area. These features result in a product that requires less extensive clean up compared to conventional joint compounds.

Another feature of this composition is the improved gloss retention when paint is applied over the surface of the joint compound. Perfect gloss retention would produce the same paint gloss level over the joint compound as the paint gloss level over the paper surface of the wallboard (100% gloss retention). Poor paint gloss over drywall seams treated with joint compound can result in walls in which the paint over all the dried joint compound has a lower sheen than the rest of the painted wall, creating an uneven appearance. Such "banding" or "flashing" can require additional finishing steps, such as skim coating, or application of primers to achieve an acceptable result. The improved gloss retention for joint compounds made with synthetic polymeric wax results in a product that can produce a more uniform appearance to the final decorative painted surface, with less effort, than conventional joint compounds.

BRIEF DESCRIPTION OF THE DRAWINGS

FIG. 5 is a graph comparing dust fallout of various concentrations of a 75/25 blend of MPEG 750 and MPEG 2000.

DETAILED DESCRIPTION OF THE INVENTION

Figure 1:
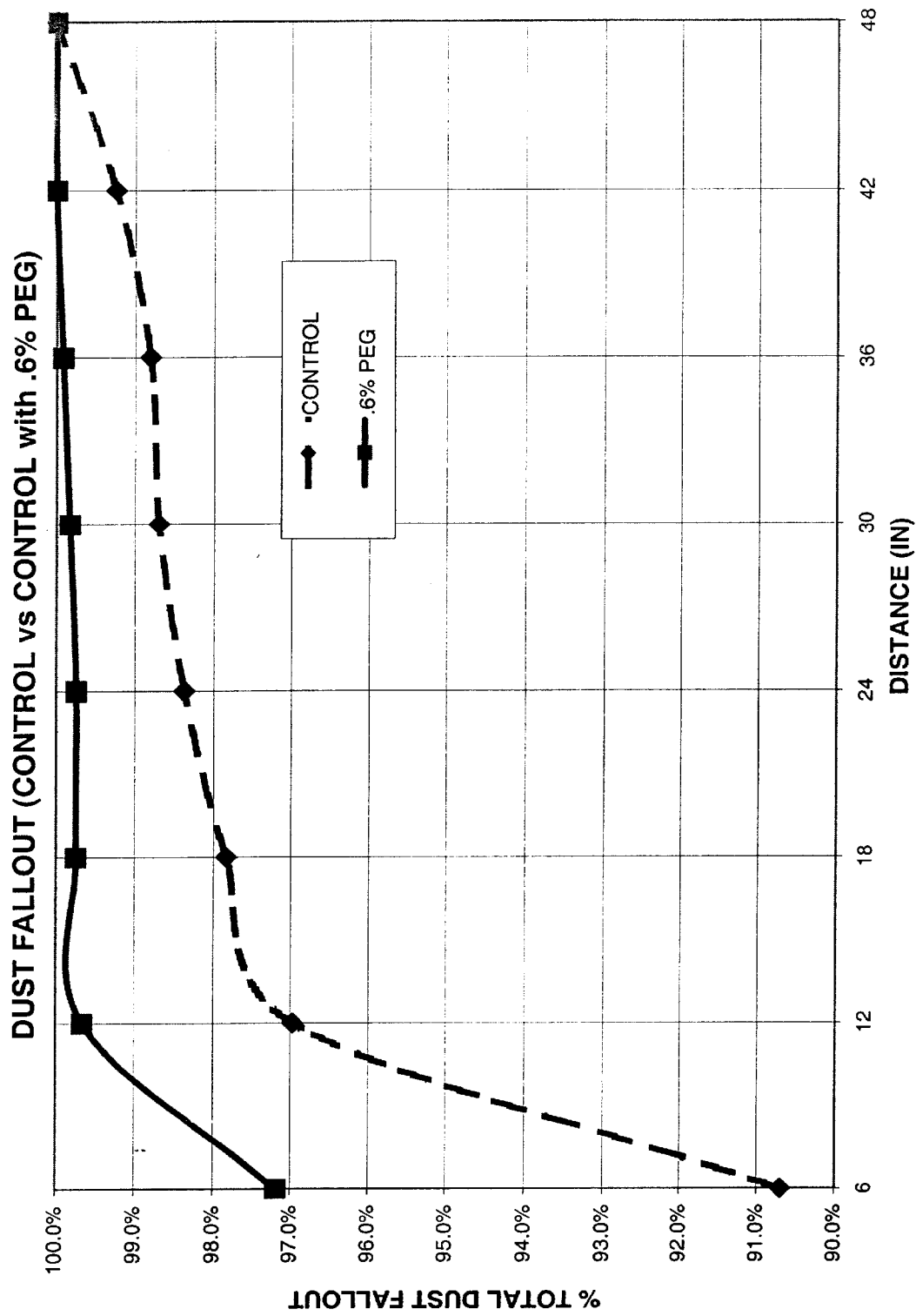
FIG. 1 is a graph comparing dust fallout of a control sample to a sample with 0.6% of a high molecular weight PEG added.

A lower dusting joint compound with higher gloss retention, provided by the invention, is made up of a filler, a binder, a thickener and a synthetic polymer wax that is at least slightly soluble in water and forms a solid at room temperature.

Synthetic Polymeric Wax

Synthetic waxes, such as water soluble linear polymers formed by the addition reaction of propylene oxide, ethylene oxide and/or alkoxy-substituted ethylene oxide with water, are included in the present joint compound to improve application properties and to reduce dust generated during sanding of the joint compound. Any of these additives can be used to control the surface absorption properties of the cured joint compound. Polyethylene glycol ("PEG"), methoxy polyethylene glycol ("MPEG"), polypropylene glycol, or combinations thereof are preferred. These additives also improve the wetness and slip of the material. Suitable compounds are in a solid form at room temperature and are at least slightly soluble in water. Synthetic waxes with melting points above 80° F. (27° C.) are sufficiently hard to be suitable for use with this invention. Preferably, the powder form of the synthetic wax is soluble in water at 20° C. to form at least 10 wt % of the solution. Other synthetic waxes, such as trifunctional polyethylene glycol (Dow Chemical, Midland, Mich.), can be used at the appropriate melting points.

The average melting point of the synthetic wax composition is important to this composition so that the wax melts at temperatures generated under sanding conditions, agglomerates the fines, and then hardens again quickly. By accumulating the fine particles into larger particles, less fines become airborne, settling closer to the sanded surface than fines from a conventional joint compound. If the wax has an average melting point that is too low, it is soft and sticky at room temperature, tending to cling to equipment or pack between the abrasive particles of sandpaper. Although there are fewer fines to clean from the floor, the sandpaper has to be changed often or equipment cleaned frequently so that the scraping surfaces are not clogged with wax-covered fines. When the average melting point of the wax is too high, the distribution of polymer lengths produces fewer waxes in the appropriate melting point range and relatively less fines are agglomerated at the same concentration. Thus, exact choice of a suitable synthetic wax is a trade-off between soft waxes that tend to stick to cutting or abrading surfaces and hard waxes that are less effective at agglomeration of fines. The wax should be chosen to produce as much agglomeration as can be tolerated by the equipment being used.

In terms of melting points, the synthetic waxes preferably have an average melting point of from about 80° F. (27° C.) to about 150° F. (66° C.). This range of melting points provides a sufficient concentration of molecules that melt under temperatures generated by hand sanding. The preferred range depends upon the nature of the wax, the intended application and the needs of the particular user. More preferably the average melting point varies between 90° F. (32° C.) and 120° F. (49° C.), even more preferably between 95° F. (35° C.) and 115° F. (46° C.). Another preferred melting point range is about 110° F. (43° C.) to about 150° F. (66° C.) particularly for straight chain polymers. Branched chain polymeric waxes have a preferred temperature range of from 80° F. (27° C.) to about 129° F. (55° C.). Most preferably, the melting point of the synthetic wax averages between about 100° F. (38° C.) and about 110° F. (43° C.). These materials are in the form of solids at room temperatures, making them suitable for use in dry joint compound mixes, as well as in ready-mix forms. Even higher melting waxes are suitable when friction generates higher temperatures at the sanded surface, such as where sanding or abrading is done by machine.

Although the suitability of a particular wax is defined by the average melting point, the preferred polyols are also discussed here in terms of molecular weight since the products are generally sold by molecular weight. Polyethylene glycols with molecular weights greater than 1450 Daltons are generally suitable. Preferably, the average molecular weight of PEG ranges from about 3350 Daltons to about 20,000 Daltons and most preferably from about 8000 Daltons to about 20,000 Daltons. The preferred molecular weight range for branched molecules would be lower, such as MPEG in the range of about 750 to about 5000 Daltons. More preferably, MPEG with an average molecular weight range of from about 750 to about 2000 Daltons is used. MPEG having an average molecular weight of from about 1000 to about 1200 is most preferred. Although molecular weight is discussed here as a convenience for identifying compounds of interest, average melting point of the compound is used to determine suitability of a wax for use in the composition of this invention.

Blends of commercially available PEG and MPEG are also suitable for use with invention. MPEG, for example, is available commercially with average molecular weights of 750, 2000 or 5000 Daltons. MPEG 750, available from Dow Chemical of Midland, Mich., has an average melting point of from about 80° F. (27° C.) to about 90° F. (32° C.). MPEG 2000 has an average melting point of from about 120° F. (49° C.) to about 129° F. (54° C.). Blends of these two materials can be used to produce intermediate average melting points. Because MPEG 750 and MPEG 2000 border one of the preferred temperature ranges, blends of these materials are especially preferred. The most preferred wax is a 75/25 blend of MPEG 750 and MPEG 2000. This blend has an average melting point of from about 100° F. to about 110° F., with an average molecular weight from about 1000 to about 1200 Daltons.

The synthetic wax is added in any suitable amount. Preferably, it is present in a concentration ranging from about 0.1% to 8% of the dry weight of the joint compound. In another preferred range, it is added at concentrations between about 0.5% and about 6%, and more preferably between about 2% and about 4%. The exact concentration of wax selected depends upon the wax chosen and the goal of the user. Soft solids, such as MPEG 750, are more preferred at lower concentrations in the range of from about 2% to about 4%. Higher melting waxes, such as PEG 8000, are preferred at higher concentrations of from about 4% to about 8% or even from about 6% to about 8%. Wax mixtures with low proportions of material that liquefy in the desired temperature range (e.g., mixtures with high proportions of high molecular weight wax) can be compensated for by using higher concentrations of the wax blend. Although the concentration of molecules that melt within the preferred range is low in a product such as PEG 8000, total amount of wax that melts within the preferred ranges is increased when the total amount of wax used increases. However, if too much wax is used, the joint compound begins to lose unrelated properties since the additional wax takes the place of binders, thickeners or other components.

Choice of the wax to be used and its concentration can also be affected by the end use of the product. A homeowner, patching only a small area in a furnished room, may prefer a product that makes no dust at the expense of time spent on the project. A joint compound using a soft solid wax at high concentration range would be useful in this context. Very little dust, if any, is generated, but the sandpaper would tend to become packed with the agglomerated waxy fines. More time would be required to change the sandpaper frequently, or at least to periodically tap the paper to remove some of the fines. On the other hand, a contractor, who has a partially constructed house to finish, may care more about getting the job done quickly than sweeping up afterward. Here, a harder wax that generates some fines but does not slow down the finishing process is likely to be suitable.

Other Joint Compound Ingredients and Additives

Types and amounts of filler vary depending on if a setting type or drying joint compound is being made. When the joint compound to be made is a drying type formulation, the amount of filler varies from about 50% to about 98%. The preferred filler is calcium carbonate in amounts of from about 65% to about 93% by weight of the dry mix for a drying type. Gypsum, or calcium sulfate dihydrate, is also useful as filler in drying type joint compounds. Calcined gypsum, or calcium sulfate hemihydrate, a preferred filler for setting type formulas, is used in any suitable amount. Preferably, the calcined gypsum is present in an amount ranging from about 50% to about 93% by weight of the dry composition, more preferably, from about 55% to about 75% by weight of the dry composition. A setting type joint compound could be based on either an alpha or beta type calcium sulfate hemihydrate. In addition to the calcined gypsum, calcium carbonate may be used in amounts of from about 0% to about 30% by weight of the dry mix for a setting type joint compound.

Additional fillers are also used to impart specific properties to the joint compounds. Mica, talc, diatomaceous earth, clays, such as attapulgite, sepiolite and kaolin, calcium sulfate dihydrate, calcium sulfate anhydrite, and pyrophylite are also suitable. Mica aids in reduced cracking of the joint compound as it dries, and is preferred in amounts of up to 25%. It is also preferred to add clay in amounts of up to about 10% to improve the body and workability of the joint compound, and as a rheology modifier. Carbonates are preferably added to setting type joint compounds, as well as being the preferred filler in a drying type joint compound as a bulking agent. The ratio of all fillers to all binders is preferably in the range of from about 15:1 to about 5:1.

Perlite or expanded perlite is a lightweight filler that may be used where the weight of the compound is important. Use of expanded perlite in a lightweight joint compound is taught in U.S. Pat. No. 4,454,267, which is herein incorporated by reference. Expanded perlite is a very lightweight material that contains many cracks and fissures. It should be treated according to the teachings of U.S. Pat. No. 4,525,388, which is hereby incorporated by reference, so that the material does not increase in weight due to water absorbed by capillary action. The treated, expanded perlite, when used, is preferably present in concentrations of at least 5% based on the weight of all ingredients of the joint compound, excluding water.

The joint compound of the present invention optionally includes resin microspheres as one of the fillers to be used in place of or in addition to expanded perlite in lightweight formulations. Preferred shell resins suitable for use in the present invention are homopolymers, copolymers, or blends of homopolymers and/or copolymers formed one or more of acrylonitrile ("ACN"), vinylidene chloride ("VDC"), or methyl methacylate ("MMA") monomers. Particularly preferred resins are polyacrylonitrile ("PACN"), polyvinylidene chloride ("PVDC"), copolymors formed from ACN and VDC, and copolymors found from ACN, VDC, and MMA. The microspheres demonstrate high resiliency to compression without collapse (non-friable) and are able to withstand the exerted shear stress (shear-stability) of a typical joint treatment manufacturing process and subsequent customer preparation.

The preferred density of the microspheres is about 0.56 lb/ft³ (0.009 g/cc) to about 8.1 lb/ft³ (0.13 g/cc). Microspheres in this density range have an optimal effect on increasing the overall volume of the joint compound. However, they are still heavy enough to allow measurement and addition of the microspheres by weight. A lightweight joint compound utilizing resin microspheres and a method of making it are disclosed in U.S. Ser. No. 09/724,736, which is herein incorporated by reference.

Any binder that is suitable for use in a joint compound is appropriate for use in the present invention. The binder is used to enhance the adhesion of the joint compound to its substrate, typically drywall. Acceptable binders include, but are not limited to latex emulsions or spray dried powders; including polyvinyl acetates, polyvinylacrylics and ethylene vinyl acetate latexes; and dispersible powders such as polyvinyl acetates, polyvinyl alcohols, polyvinyl acrylics, ethylene vinyl acetates, vinyl chlorides, styrene acrylics and starches, or combinations (blends and/or copolymers) thereof.

Preferred binders are soft and pliable rather than being extremely hard. Hard binders are likely to create more fine dust particles compared to pliable polymers. Latex binders are most preferred in the present invention. The concentration of the latex binder in a conventional weight joint compound of the invention (14 lbs./gal. density) ranges from about 1% to about 2.5% of the total dry weight. The concentration of binder in a lightweight joint compound ranges from 2% to about 6% of the dry weight. In the present invention, the concentration of the latex binder ranges preferably from about 1% to about 3.5%.

Starch may be added to the joint compound in amounts up to about 5% by weight of the dry ingredients to provide good adhesion and increase surface hardness. Starch also can function as a water retention aid, thickener and internal binder. Preferred starches are usually pregelatinized for lump-free incorporation into the joint compound.

Bonding between the joint compound and the substrate is improved by the addition of thickeners, plasticizers and/or polyvinyl alcohol powder. Thickening agents also are added to the joint compound of the present invention for other reasons. After water is added to the composition, the thickener becomes hydrated and swells, thereby thickening the composition. Thickeners are useful, for example, in helping to create the body and flow properties commonly associated with joint compounds. Desirably, the thickener is selected so that it substantially hydrates during the mixing process after water is added to the composition, with little or no hydration of the thickener occurring after mixing is completed, to prevent formation of lumps in the joint compound.

Suitable thickening agents include hydroxypropylmethylcellulose, hydroxyethylcellulose, cellulose-based gums, such as xanthan, arabic, alginate, pectin and guar gums, either alone or in combination. Cellulosic thickeners are preferred, with BERMOCOLL® providing the best results. Many conventional cellulosic thickeners, such as ethylhydroxy ethylcellulose, hydroxypropyl methylcellulose, methyl hydroxypropyl cellulose and hydroxyethyl cellulose, are also suitable in the joint compounds of this invention. The concentration of cellulosic thickener ranges from about 0.05% to about 2% of the dry weight of the joint compound ingredients. Preferably, it is present in an amount of from about 0.1% to about 1.0%.

Set control additives or chelating agents are also added to setting type formulations to control set initiation or rate during the shelf life and use of the product. Preferred set control additives include, but are not limited to potassium sulfate, calcium sulfate, aluminum sulfate, boric acid, sodium citrate, citric acid, tartrates, or proteineacious materials, or the like, and combinations thereof. Those skilled in the art will recognize that the choice of set control additive and the concentration depends on the desired hydration time and hydration rate.

When the setting type, ready mix joint compound is to be applied, a catalyst is used to overcome the suspended set state and initiate the hydration reactions. Preferably, a zinc salt catalyst is used, as taught in U.S. Pat. No. 5,746,822, which is herein incorporated by reference. If a setting type, ready-mix joint compound is utilized without the catalyst, it functions as a drying type joint compound.

The use of a trimetaphosphate ion is also contemplated for use with this invention. Setting type joint compounds utilizing trimetaphosphate ions have enhanced green strength, final strength or both. However, since the trimetaphosphate ion is unstable at high pH, it is preferable to maintain the pH below 9 in compositions where trimetaphosphate ions are used. Use of trimetaphosphate salts in joint compounds is disclosed in U.S. Ser. No. 09/718,279, filed Nov. 22, 2000, herein incorporated by reference.

Other preferred additives of the present joint compound include surfactants, wetting agents, soaps and alkyl benzene sulfonates. A soap, or detergent, is a complex mixture of ingredients including, but not limited to acids, bases, antimicrobal agents, antiredeposition agents, colorants, fragrances, defoamers, foaming agents, hydrotropes, moisturizers, preservatives, solvents, thickeners or surfactants, selected from many possible functional groups. Alkyl benzene sulfonate is a specific surfactant that is particularly useful in formulations of this nature, as taught in co-pending U.S. application Ser. No. 09/724,674, filed Nov. 29, 2000, for a Joint Compound Additive for Reduction of Cracking, Cratering and Shrinkage, which is herein incorporated by reference. The preferred joint compound of this invention utilizes sodium dodecyl benzene sulfonate to improve several properties of the joint compound including, crater resistance, crack resistance, and shrinkage reduction. In lightweight joint compounds, soaps and alkyl benzene sulfonates also help to decrease the density of the joint compound.

One highly preferred embodiment of the present invention includes 74.4% calcium sulfate dihydrate, 10.6% perlite, 5.0% of a clay thickener, 0.9% of an ethylhydroxy ethylcellulose thickener, 5.8% of a binder, 0.15% of a biocide, 0.15% of a fungicide and 3.0% of a blend of methoxy polyethylene glycol.

Joint compounds provided by the invention are usually made by first combining all dry ingredients in a powder mixer. Water and any additional wet ingredients are then combined with the dry mixture, either at the point of manufacture or at the time of use. Since the synthetic wax is in a dry powder form, it is preferably metered into the other dry ingredients and added to the compound at the powder mixer. Water is then added to the dry ingredients, either during manufacture or immediately prior to use, in an amount to obtain the desired viscosity, usually 300-550 Brabender Units (pin probe). Water is present in the slurry in an amount ranging from about 14% to about 75% by weight of the wet composition, more preferably, in an amount ranging from about 23% to about 55% by weight of the composition. The invention is useful in either a ready-mixed form or as a dry powder to which water is added at the time of use. Either form is suitable for either a drying type or a setting type joint compound.

The joint compound described above is useful in finishing of joints for new construction as well as patching cracks or holes in existing walls. When joints between abutting edges of wallboard are being finished, the area to be finished is coated with the joint compound. A reinforcing tape is embedded in the joint compound while it is still wet. When dry, a second coating of joint compound is applied to the seam. When dry, the seam is sanded lightly. An optional third coat can be applied, with the seam drying and being sanded in between. Patching of small holes or imperfections in the wall are repaired by applying one or more coats of joint compound, allowing the coat to dry and lightly sanding between coats. Whether finishing or patching, the final coat is allowed to dry and sanded to create a smooth, monolithic surface over the entire wall.

EXAMPLE 1

A lightweight joint compound was used as a base joint compound for this series of tests, and had the composition shown in Table I. The base joint compound is a commercial, ready-mix, drying type compound. There were no oils, paraffins, waxes, petroleum fractions, or glycols known to affect dusting properties present in the base joint compound. A sample of the base joint compound was labeled Sample A, and used as a control or comparative sample. A second sample of the base joint compound, Sample B, was modified by addition of CARBOWAX® 8000 (Dow Chemical, Midland, Mich.) at a concentration of 0.6%.

TABLE I

Composition of Base Joint Compound

| | |
|---|---|
| Calcium Carbonate Filler | 74.72% |
| Polyvinyl Acetate Binder | 7.20% |
| Attapulgite Clay | 4.69% |
| Perlite Filler | 12.37% |
| Preservative | 0.2% |
| Thickener | .84% |

Samples A and B were tested for the propensity to create airborne dust. A standard sample was prepared by creating a ten inch wide coating on a vertical 2x4 foot SHEET-ROCK® brand ⅜" paper covered gypsum board. The coating was applied lengthwise down the center of the board to create a sample coating 10 inches wide and 4 feet long. The coating was allowed to dry in a controlled room environment at 75° F. and 50% relative humidity. A second coating layer was applied over the first and allowed to dry. The board was positioned with its 4 foot length in a vertical orientation with the bottom edge of the board 6 inches from the floor. The sample of joint compound having a 10 inch width extended from 6 inches to about 54 inches above the floor, from one edge of the board to the other. The sample was sanded the entire length of the sample coating with 20 strokes within 30 seconds or 1.5 strokes per second using a standard pole sander loaded with 220-grit sandpaper. Dust was allowed to settle for ten minutes.

Dust fallout was collected from 6 by 12 inch panels positioned in series on the floor in a straight line away from the sample. The edge of the first panel was positioned immediately below the coating sample, and extending six inches away from the coating. Subsequent panels were placed with an edge adjacent the previous panel and extending six inches away from the previous panel. Each panel was weighed before sanding and again after the dust settled to determine the amount of dust that fell on that panel. Dust fell to the right and left of the panels, but no attempt was made to collect all of the dust that was lost from the sample. However, changes can be seen in the distribution of the dust that was collected for each test. The percentages reported in the following tables refer to the percentage of dust on a particular panel compared to the total dust that was collected.

The finer particles are expected to remain airborne longer, and deposit at a greater distance from the sample. The following results in Table II show the cumulative percentage of dust recovered at a given distance from the sanded joint compound sample. These results are also presented in FIG. 1.

TABLE II

Dust Fallout Distance

| Inches | A | B |
|---|---|---|
| Additive | None | 0.6% Carbowax ® 8000 |
| 0–6 | 90.7% | 97.2% |
| 6–12 | 6.3% | 1.5% |
| 12–18 | 0.8% | 0.0% |
| 18–24 | 0.6% | 0.0% |
| 24–30 | 0.3% | 0.1% |
| 30–36 | 0.1% | 0.1% |
| 36–42 | 0.4% | 0.1% |
| 42–48 | 0.8% | 0.0% |

EXAMPLE 2

Figure 2:
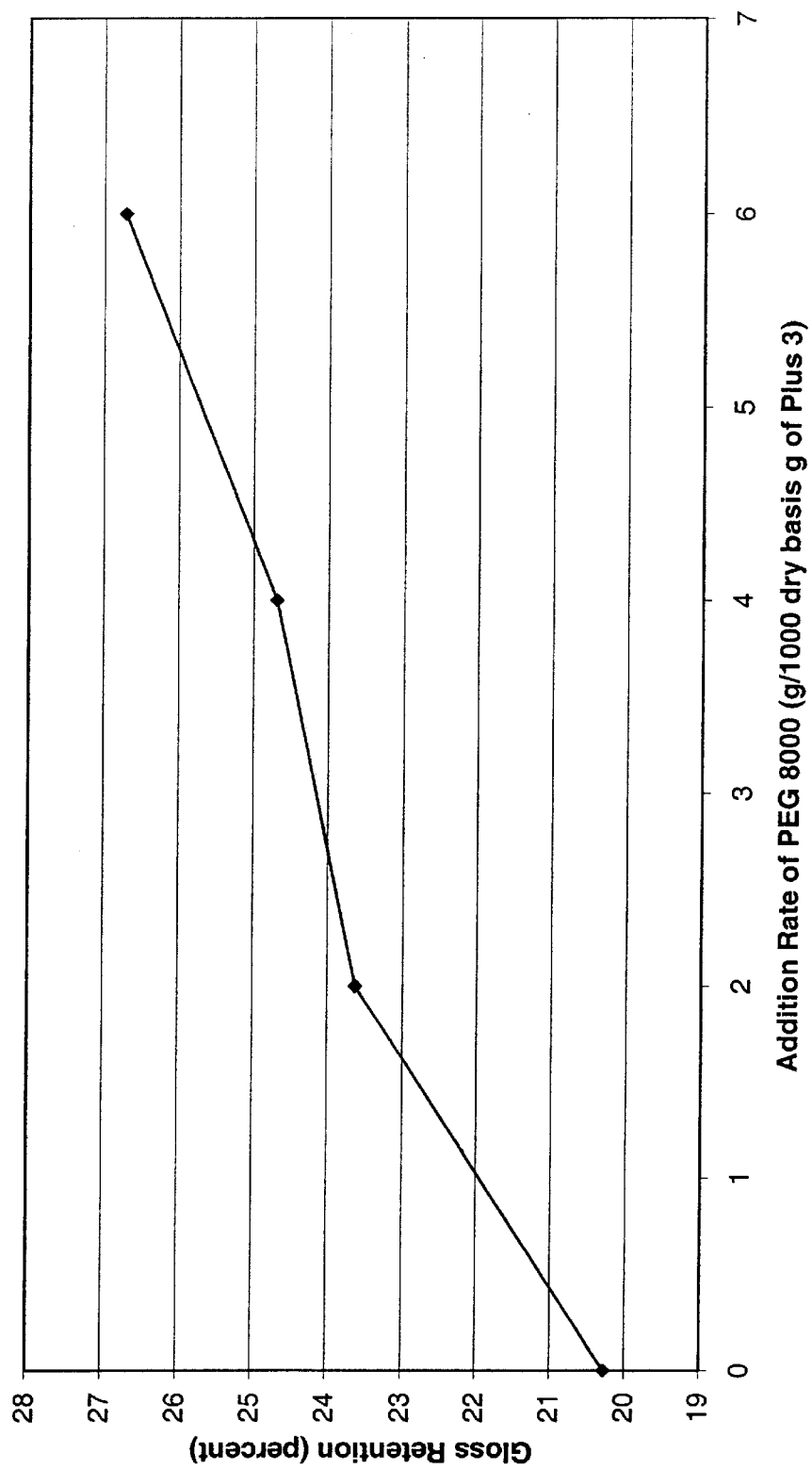
FIG. 2 is a graph showing improved gloss retention at various concentrations of a high molecular weight PEG.

Additional samples of the base joint compound were modified with either 0.2% or 0.4% by weight of CARBOWAX® 8000 (average molecular weight 8000 Daltons) polyethylene glycol. The samples were applied to wallboard and painted, with the object to compare the paint gloss values over the areas with and without an underlayer of joint compound. All samples were thinned with water to 200 Brabender viscosity (pin probe) and applied with a 10 inch Ames Tool box (depth control setting #2) over a drywall panel. After the joint compound had dried, it was painted with one coat of Sherwin Williams 1481 "Vizcaya" using a roller with ⅜" nap roller cover. Gloss values were obtained with a BYK Glossmeter, set for semi-gloss and 85° angle. This test procedure is a modification of ASTM D523-89. The following gloss values were observed. These results are also shown in FIG. 2.

TABLE III

Effect of PEG on Paint Gloss Retention over Joint Compound

| | | | | |
|---|---|---|---|---|
| CARBOWAX ® 8000 Concentration in Base Joint Compound of Example 1 | 0% | 0.2% | 0.4% | 0.6% |
| Gloss Retention* | 20.28% | 23.63% | 24.69% | 26.72% |

*Gloss retention expressed as the gloss reading (average of eight readings from different points on the surface of the sample) from the painted surface over the sample joint compound divided by the gloss reading (average of eight readings from different points on the surface of the sample) from a painted surface over paper-surfaced wallboard and then multiply the result by 100%.

As the concentration of PEG increased, the joint compound showed improved gloss retention. Perfect gloss retention would produce the same paint gloss level over the joint compound as the paint gloss level over the paper surface of the wallboard (100%). Thus the addition of polyethylene glycol to a joint compound can improve the paintability of the joint compound, and increase the value and utility of the product.

Qualitative testing also indicated that as the PEG concentration increased, so did the amount of fines that fell within a defined distance of the sample, indicating that they were not merely entrained in the ambient air. In addition, it was also observed that as the level of PEG was increased so did the overall drying time.

EXAMPLE 3

Figure 3:
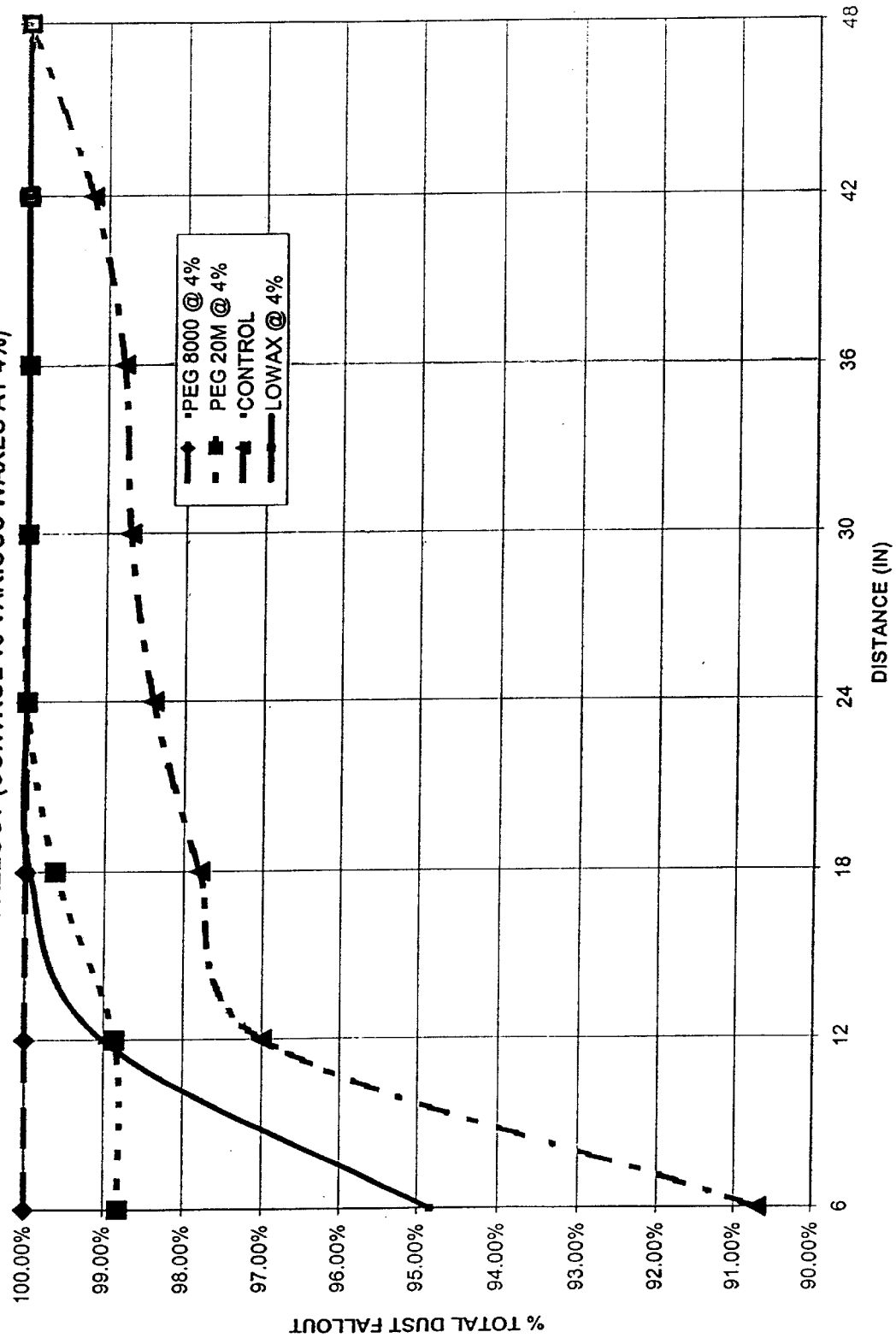
FIG. 3 is a graph comparing dust fallout of a control sample with additives of varying molecular weights.

SHEETROCK® brand Lightweight Joint Compound Plus 3 was used as a base compound for a series of tests varying the molecular weight of the synthetic wax additive at concentrations of 4% dry weight. The additives tested were a polyethylene glycol having an average molecular weight of 8000 Daltons, an oxidized polyethylene glycol having an average molecular weight of 4000 Daltons and a polyethylene glycol having an average molecular weight of 20,000 Daltons. The samples were sanded and the dust collected as described in Example 1. Distribution of dust for each of the samples is shown in Table IV and in FIG. 3.

TABLE IV

Dust Fallout Distribution

| Inches | A | B | C | D |
|---|---|---|---|---|
| MW | 0 | 8000 | 17,500 | 4000 |
| 0–6 | 90.7% | 100.0% | 98.8% | 94.8% |
| 6–12 | 6.3% | 0.0% | 0.1% | 4.2% |
| 12–18 | 0.8% | 0.0% | 0.7% | 0.9% |
| 18–24 | 0.6% | 0.0% | 0.0% | 0.1% |
| 24–30 | 0.3% | 0.0% | 0.0% | 0.0% |
| 30–36 | 0.3% | 0.0% | 0.0% | 0.0% |
| 36–42 | 0.4% | 0.0% | 0.0% | 0.0% |
| 42–48 | 0.8% | 0.0% | 0.0% | 0.0% |

In all cases, the addition of a high molecular weight synthetic wax at a 4% concentration resulted in all of the dust falling within 24 inches of the sample after sanding. The joint compound made with CARBOWAX® 8000 brand polyethylene glycol produced fines that all fell within 6 inches of the sample, and there was no noticeable airborne dust at all.

Samples with high molecular weight synthetic wax at a 4% concentration also were slower drying than a conventional joint compound. This is a useful attribute, particularly for home repair where the user often has little or no experience working with joint compounds. The improved workability and slower drying time gives the home user more time to work the compound before it begins drying at the edges. If a smooth and evenly feathered joint is obtained before the joint compound dries, less sanding and fewer coats are required overall.

EXAMPLE 4

Blends of MPEG 750 and MPEG 2000 were studied to determine an optimum blend. Samples comprising 100% MPEG 750, 25% MPEG 2000/75% MPEG 750, 50% MPEG 2000/50% MPEG 750, 75% MPEG 2000/25% MPEG 750 and 100% MPEG 2000 were tested. As the ratio of these components varied, the total of 3% wax was maintained in each of five samples. The base components of the control and the wax-containing samples are summarized in Table V.

TABLE V

Sample Compositions

| Material | Control 6128B | Test Samples 7974 Series |
|---|---|---|
| Fillers | 88.0% | 85.0% |
| Thickeners | 5.9% | 5.9% |
| Binder | 5.8% | 5.8% |
| Preservatives | 0.30% | 0.30% |
| MPEG Blend | 0.0% | 3.0% |

The test procedure described in Example 1 above was used, except the sandpaper used was 150 grit instead of 220 grit. The control joint compound and samples of five joint compounds with varying combinations of MPEG 750 and MPEG 2000 were applied to gypsum board, allowed to dry and sanded. The distribution of fines was measured. The weights of fines collected on panels at the distances indicated from the test wall are included in Table VI below.

TABLE VI

Dust Distribution of MPEG 750 / MPEG 2000 Blends

| Sample | JE-2128B | JE-7974A | JE-7974B | JE-7974C | JE-7974D | JE-7974E |
|---|---|---|---|---|---|---|
| MPEG 2000 | 0 | 3.00% | 2.25% | 1.50% | 0.75% | 0 |
| MPEG 750 | 0 | 0 | 0.75% | 1.50% | 2.25% | 3.00% |
| 0–6 inches | 68.23 | 59.60 | 56.68 | 78.57 | 87.10 | 75.47 |
| 6–12 inches | 19.73 | 21.21 | 19.79 | 15.71 | 12.90 | 18.87 |
| 12–18 inches | 7.36 | 9.09 | 10.16 | 2.86 | 0.00 | 3.77 |
| 18–24 inches | 3.01 | 6.06 | 6.95 | 1.43 | 0.00 | 1.89 |
| 24–30 inches | 1.00 | 3.03 | 4.28 | 1.43 | 0.00 | 0.00 |
| 30–36 inches | 0.33 | 1.01 | 1.60 | 0.00 | 0.00 | 0.00 |
| 36–42 inches | 0.33 | 0.00 | 0.53 | 0.00 | 0.00 | 0.00 |
| 42–48 inches | 0.00 | 0.00 | 0.00 | 0.00 | 0.00 | 0.00 |

The data above shows that MPEG 750, MPEG 2000 and blends thereof are useful in reducing dust when added to a base joint compound in the amount of 3% by weight. MPEG 2000 alone, or blended with 25% MPEG 750, is less effective than blends with lower average molecular weights when sanding is done by hand. Since melting point is proportional to molecular weight, higher molecular weight compounds are expected to have higher melting points. The average melting point of MPEG 2000 alone is from about 120° F. (49° C.) to about 129° F. (54° C.), slightly above the temperatures generated by the friction of hand sanding. In particular, a blend of 75% MPEG 750 and 25% MPEG 2000 produces fines that all fell within 12 inches of the sanded surface. Virtually no fines became airborne or were carried beyond 12 inches from the wall, providing for easy clean-up of the dust that was generated.

Figure 4:
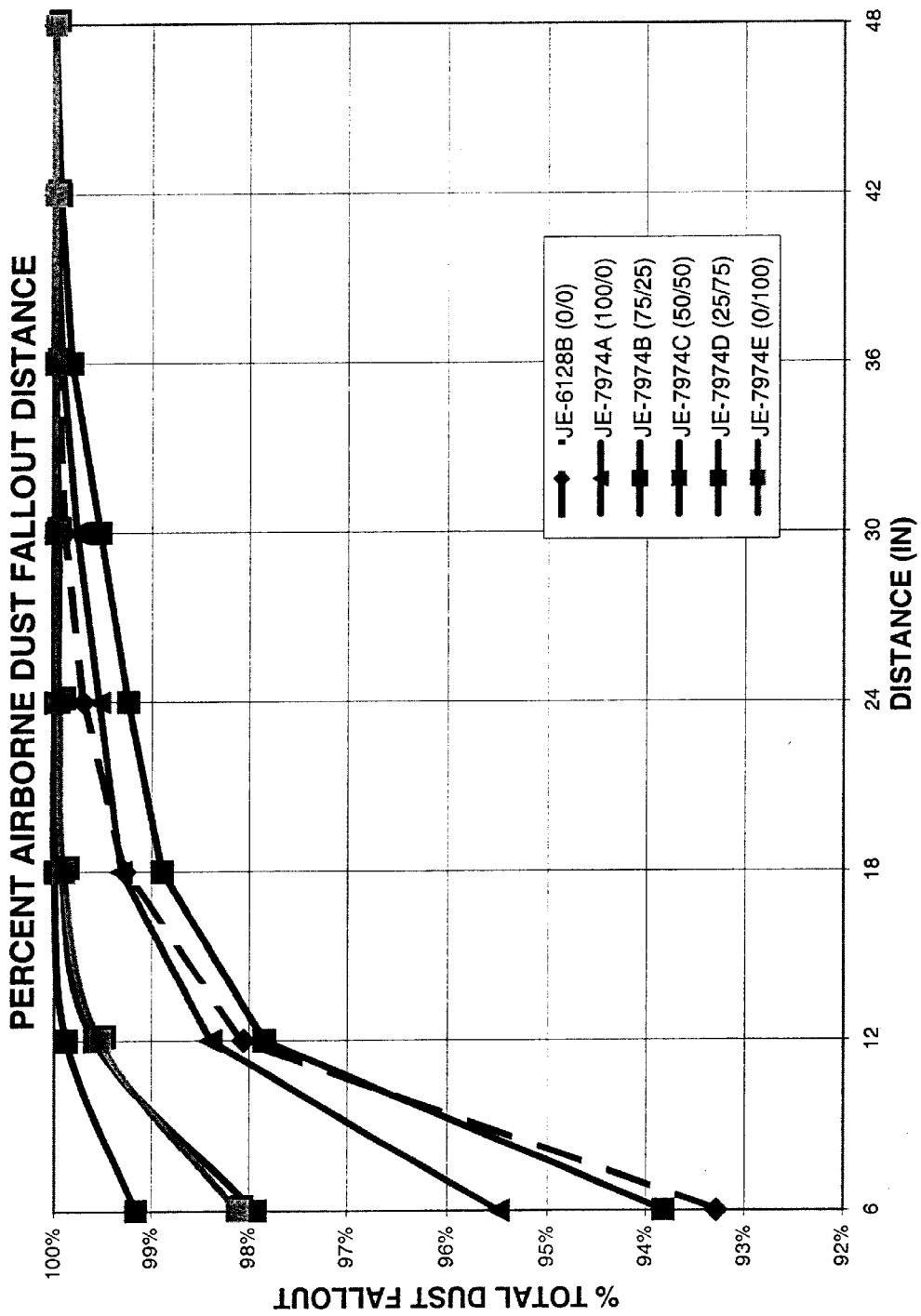
FIG. 4 is a graph comparing dust fallout of a 3% concentration of various blends of MPEG 750 and MPEG 2000.

Graphical representation of the fallout of various blends of MPEG 750 and MPEG 2000 at a concentration of 3% is shown in FIG. 4.

EXAMPLE 5

Samples were prepared with various concentrations of a particular MPEG Blend to determine suitable concentrations. The composition of the MPEG blend was held constant at 75% MPEG 750 and 25% MPEG 2000, the optimum blend determined in Example 4. Only the amount of the blend that was added to the base joint compound varied, not the ratio of components within the blend.

In preparing the samples, the concentration of calcium carbonate filler (HUBER Q200) was varied inversely with the concentration of the MPEG Blend. Concentrations of the following components were constant across all samples that included the MPEG Blend: 10% perlite (SILCELL® 35-34), 5% clay thickener (Gel B), 5.8% latex adhesive (Halltech HP41-355), 0.15% of a biocide (NUOSEPT® 91), 0.15% of a fungicide (FUNGITROL® 158) and 0.9% cellulosic thickener (BERMOCOLL® E451FQ).

The concentrations of the calcium carbonate filler, the MPEG blend and water are listed in Table VII with the dust distribution data for the series of samples. Percentages shown are the weight percentages based on the dry ingredients.

TABLE VII

Dust Fallout Distribution of Various Concentrations of a Fixed MPEG Blend

| Material | 6128B | 7988A | 7988B | 7988C | 7988D | 7988E |
|---|---|---|---|---|---|---|
| Calcium Carbonate | 75.4% | 77.0% | 76.0% | 75.0% | 74.0% | 73.0% |
| MPEG Blend | 0.0% | 1.0% | 2.0% | 3.0% | 4.0% | 5.0% |
| Water (ml/Kg dry components) | 770 | 750 | 740 | 765 | 720 | 780 |
| 0–6 inches | 39.46% | 53.33% | 57.14% | 100.0% | 66.67% | 100.0% |
| 6–12 inches | 21.05% | 20.00% | 28.57% | 0.0% | 33.33% | 0.0% |
| 12–18 inches | 13.16% | 13.33% | 14.29% | 0.0% | 0.0% | 0.0% |
| 18–24 inches | 10.53% | 6.67% | 0.0% | 0.0% | 0.0% | 0.0% |
| 24–30 inches | 7.89% | 6.67% | 0.0% | 0.0% | 0.0% | 0.0% |
| 30–36 inches | 5.26% | 0.0% | 0.0% | 0.0% | 0.0% | 0.0% |
| 36–42 inches | 2.63% | 0.0% | 0.0% | 0.0% | 0.0% | 0.0% |
| 42–48 inches | 0.0% | 0.0% | 0.0% | 0.0% | 0.0% | 0.0% |

Figure 5:
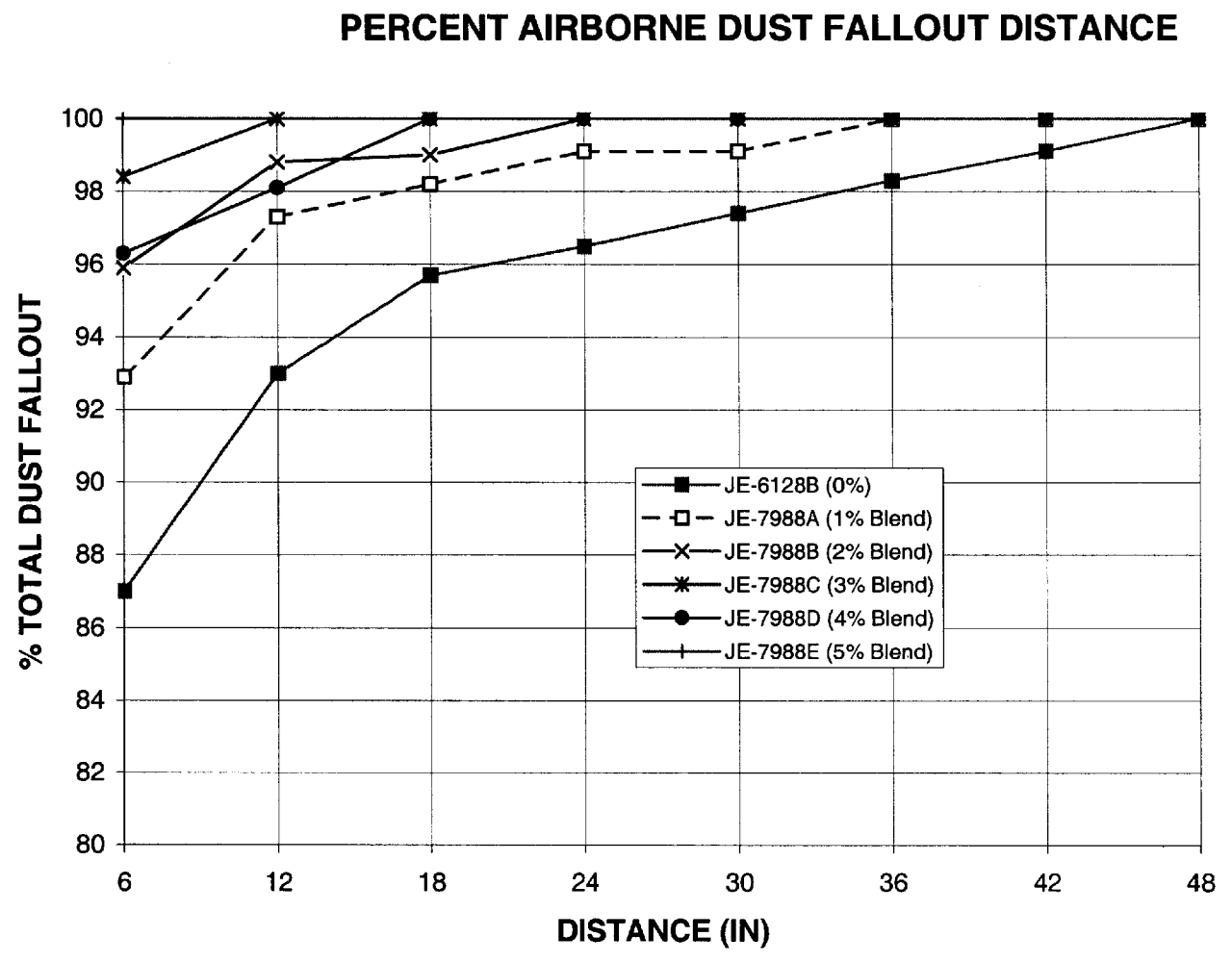

The samples were prepared and tested as described in Example 4. Distribution of dust collected from each of the panels is shown in Table VII and graphically in FIG. 5. Optimum concentration of this MPEG blend appears to be between 2 and 4% by weight. At 2%, slightly more dust is generated compared to higher levels, however, this may be the preferred concentration for contractors who are willing to have some dust in exchange for a less expensive product and limited stops in their work to clean sandpaper or tools. Loadings of 3% and 4% produce fewer fines, but have increasing packing of the fines in the sandpaper.

Materials used in the above examples and a source for each is listed below:
Calcium Carbonate Filler—HUBER® Q200—J. M. Huber Corporation; Atlanta, Ga.
Perlite Filler—SILCELL® 35-34—Silbrico Corporation; Hodgkins, Ill.
Clay Thickener—Gel B—Milwhite, Inc.; Houston, Tex.
Cellulosic Thickener—METHOCEL® J75MSN—Dow Chemical Company; Midland, Mich.
Cellulosic Thickener—NEXTON® J20R—Hercules Inc.; Wilmington, Del.
Cellulosic Thickener—BERMOCOLL® E451 FQ—Akzo Nobel; Stratford, Conn.
Binder—Halltech HP41-355—Halltech Inc.; Scarborough, Ontario
Biocide—NUOSEPT® 91—Creanova Inc.; Parsippany, N.J.
Fungicide—FUNGITROL® 158—Creanova Inc.; Parsippany, N.J.
Synthetic Wax—CARBOWAX® 8000 synthetic polyethylene glycol wax—Dow Chemical Company; Midland, Mich.
Synthetic Wax—MPEG 750—Dow Chemical Company; Midland, Mich.
Synthetic Wax—MPEG 2000—Dow Chemical Company; Midland, Mich.
Synthetic Wax—Oxidized PEG 4000—BASF Corp., Mount Olive, N.J.
Synthetic Wax—PEG 20K—BASF Corp., Mount Olive, N.J.

While particular embodiments of the low dusting joint compound have been shown and described, it will be appreciated by those skilled in the art that changes and modifications may be made thereto without departing from the invention in its broader aspects and as set forth in the following claims.

What is claimed is:

1. A joint compound composition comprising a filler, a binder, a thickener and one or more synthetic polymeric waxes, wherein each of said one or more waxes is at least slightly soluble in water and forms a solid at room temperature.

2. The composition of claim 1 wherein said joint compound comprises at least 50 wt % of said filler on a dry basis.

3. The composition of claim 1 wherein each of said polymeric waxes has an average melting temperature from about 80° F. (27° F.) to 150° F. (66° C.).

4. The composition of claim 1 further comprising resin microspheres having a density of from about 0.56 lb/ft$^3$ (0.009 g/cc) to about 8.1 lb/ft$^3$ (0.13 g/cc).

5. The composition of claim 1 wherein said binder comprises a latex binder.

6. The composition of claim 1 wherein said wax is present in a concentration of about 0.1 wt % to about 8.0 wt % on a dry basis.

7. The composition of claim 1 wherein each of said one or more synthetic polymeric waxes comprises at least one water soluble polymer formed by the addition reaction of water with at least one of propylene oxide, ethylene oxide or alkoxy-substituted ethylene oxide.

8. The composition of claim 7 wherein said filler comprises at least one of calcium carbonate, calcium sulfate dihydrate or calcium sulfate hemihydrate.

9. The composition of claim 7 wherein at least one of said synthetic waxes comprises polyethylene glycol.

10. The composition of claim 9 wherein each of said polyethylene glycols has a melting point of from about 110° F. (43° C.) to about 150° F. (66° C.).

11. The composition of claim 9 wherein said polyethylene glycol is present in a concentration of about 4.0 wt % to about 8.0 wt % on a dry basis.

12. The composition of claim 7 wherein at least one of said one or more synthetic waxes comprises methoxy polyethylene glycol.

13. The composition of claim 12 wherein said methoxy polyethylene glycol has a melting point of from about 80° F. (27° C.) to about 129° F. (55° C.).

14. The composition of claim 12 wherein said methoxy polyethylene glycol is present in a concentration of about 2.0 wt % to about 4.0 wt % on a dry basis.

15. The composition claim 12 wherein one of said one or more synthetic polymeric waxes comprises a methoxy polyethylene glycol blend having an avenge melting point from about 95° F. (35° C.) to about 115° F. (46° C.).

16. The composition of claim 12 wherein said synthetic polymeric waxes comprises a blend of polyethylene glycol and methoxy polyethylene glycol.

17. The composition of claim 15 wherein said blend comprises at least two methoxy polyethylene glycol compounds.

18. The composition of claim 1 wherein said polymeric wax is present in a concentration of about 0.5 wt % to about 6.0 wt % on a dry basis.

19. A method of finishing a joint between adjacent gypsum board panels comprising applying a composition to said joint, said composition comprising water, a filler, a binder, a thickener and at one or more synthetic polymeric waxes, each of which is at least slightly soluble in water and forms a solid at room temperature.

20. The method of claim 19 further comprising taping said joint.

21. The method of claim 19 further comprising allowing said composition to dry and sanding said joint.

22. The method of claim 19 wherein one of said said one or more synthetic polymeric waxes comprises a methoxy polyethylene glycol having a melting point of from about 80° F. (27° C.) to about 129° F. (55° C.).

* * * * *